United States Patent [19]
Dynan

[11] 3,849,780
[45] Nov. 19, 1974

[54] DUAL POLARIZATION RESPONSIVE RADAR HAVING IMPROVED RESPONSE TO SMALL TARGETS

[75] Inventor: Forest J. Dynan, Santa Ana, Calif.

[73] Assignee: Rockwell International Corporation, El Segundo, Calif.

[22] Filed: Mar. 12, 1969

[21] Appl. No.: 808,043

[52] U.S. Cl........ 343/7 A, 343/17.1 R, 343/100 PE
[51] Int. Cl.............................................. G01s 7/34
[58] Field of Search.......... 343/17.1 R, 100 PE, 7 A

[56] References Cited
UNITED STATES PATENTS
3,392,387  7/1968  Kirkpatrick.................... 343/7 A X
3,465,336  9/1969  Fishbein et al................. 343/7 A X Primary Examiner—T. H. Tubbesing
Attorney, Agent, or Firm—L. Lee Humphries; Rolf M. Pitts

[57] ABSTRACT

A single-plane polarized pulsed energy system for simultaneous transmission of a plurality of carrier frequencies and a receiver having two plane polarization-sensitive channels responsive to respective mutually orthogonally polarized components of received echoes, the polarization sensitive plane of one of which components corresponding to the transmitted polarization. Receiver signal processing means responsive to both said receiver channels distinguishes discrete targets from clutter, while providing a suppressed clutter display for ground map orientation of such targets.

10 Claims, 3 Drawing Figures

INVENTOR.
FOREST J. DYNAN

ATTORNEY

DUAL POLARIZATION RESPONSIVE RADAR HAVING IMPROVED RESPONSE TO SMALL TARGETS

CROSS REFERENCES TO RELATED APPLICATIONS

1. U.S. application Ser. No. 430,141 filed Feb. 3, 1965, by J. O. Anderson, et al, for a Radar System Having Improved Response to Small Targets, now U.S. Pat. No. 3,500,404.

2. U.S. application Ser. No. 476,630 filed Aug. 2, 1965, by C. R. Barrett, et al, for a Multiple Frequency Radar System Having Improved Response to Small Targets, now U.S. Pat. No. 3,745,578.

BACKGROUND OF THE INVENTION

In the utilization of a pulsed energy ranging system in an airborne application as a terminal guidance aid for navigation or weapon delivery purposes, it is desirable to be able to distinguish small, "cultivated" (i.e., man-made) non-moving discrete targets of interest from the clutter background in which such targets occur.

It has been discovered that the signal-to-clutter ratio for small targets (e.g., targets having a transverse extent less than the antenna beamwidth, and presenting a radial extent less than that represented by the transmitted pulsewidth) may be substantially and significantly enhanced by the pulsed transmission of a plurality of discrete carrier frequencies, representing a plurality of successively increased frequencies, the frequency difference between successive frequencies being not less than that bandwidth corresponding to the reciprocal of the transmitted pulsewidth; and then combining the echoes thereof received from a given target direction and range. Such technique is more fully discussed in copending U.S. application Ser. No. 430,141 filed Feb. 3, 1965, for a Radar System Having Improved Response to Small Targets, by James O. Anderson, et al, and copending U.S. Pat. application Ser. No. 476,630 filed Aug. 2, 1965, for a Multiple Frequency Radar System Having Improved Response to Small Targets, by C. R. Barrett, et al, both of which applications are owned by North American Rockwell Corporation, assignee of the subject invention. The last referenced application teaches the utilization of a single modulating frequency source in closed loop cooperation with a radio frequency source to provide the concomitantly transmitted discrete frequencies of uniform frequency-spacing and having a selected mutual phase relation, for improved performance in discrete target enhancement.

By means of the above-described techniques, those components of the received echoes from a small target tend to correlate or cumulatively combine to provide an enhanced signal indicative of the presence of such small target; while the components of the received echoes from a clutter background in the vicinity of the target tend to mutually decorrelate (1) over the duration of the pulsewidth echo for each discrete frequency and (2) as between the received echoes of two discrete frequencies, as to provide an attenuated clutter return.

Another technique of distinguishing discrete targets from amid a clutter background utilizes differences in the polarization characteristics of the received signals, as described for example in U.S. Pat. No. 3,403,397 issued to R. C. Harrington, et al, for Duochromatic Indicator for a Diversity Polarization Radar Receiver. Such patent teaches the separate processing of mutually orthogonally polarized components of a received signal for the excitation of separate ones of different colored phosphors of a cathode ray tube display system.

A monopulse type target tracking radar employing polarization diversity is taught in U.S. Pat. No. 3,359,555 issued to R. E. Taylor for avoiding the effects of polarization-selective signal fading. Phase lock loops are employed in the processing of mutually orthogonally polarized components of the monopulse difference signals, which are aligned and then combined to provide an angle-tracking receiver signal less susceptible to fading.

The use of a dual polarization receiver is also taught in U.S. Pat. No. 3,049,703 to D. C. Davis for improving the detection of a discrete target amid a clutter background, such as a target aircraft amid a rainstorm. In such an arrangement, the video-detected amplitude difference between two mutually orthogonally polarizated components of a received signal is utilized for differential gain control of the diversity polarization receiver channels.

The combination of polarization diversity and carrier frequency diversity is taught in U.S. Pat. No. 3,403,394 issued to C. L. Rouault for overcoming atmospheric anomalies in radio frequency propogation. In such an arrangement, the transmitter pulsewidth is split into subpulse intervals, and a separate carrier frequency employed for each subpulse. The received diverse polarization echoes for each frequency are separately processed, like polarizations of the different carrier frequencies being compensatorily delayed, additively combined and then selectively processed to optimize the usable information output from the receiver. Such prior-art multiple-frequency technique, however, does not demonstrate the degree of clutter suppression inherent in the mutually-coherent, simultaneous multiple frequency transmission technique of the above-noted copending application Ser. No. 476,630 filed Aug. 2, 1965.

Further, the additive or substractive combining of polarization diversity components of a received radar echo does not necessarily provide adequate display of clutter or terrain (in those regions absent a target of interest) while suppressing that clutter background which includes the presence of a target of interest; whereby a discrete target of interest may be both distinguished from and mapped, or located relative, to the clutter background amid which is occurs.

SUMMARY OF THE INVENTION

By means of the concept of the subject invention, there is provided a pulsed energy system utilizing both the simultaneous transmission of a plurality of mutually coherent carriers having a common single plane of polarization and receiver-processing of the mutually orthogonal polarization components of received echoes of such transmission, one component having a polarization plane parallel to that transmitted and the second component being cross-polarized relative thereto. By normalizing the parallel polarization component at each range as an inverse function of the cross-polarization component at such range, a discrete target of interest may be distinguished from a clutter background while providing a suppressed clutter display for ground map orientation of such targets.

In a preferred embodiment of the invention, there is provided a pulsed energy ranging system for enhancing the detection of discrete targets against an associated clutter background, comprising transmitting means for simultaneous transmission of a plurality of mutuallly coherent carrier frequencies having a common single plane of polarization and including a spacing frequency oscillator for providing a frequency equal to an integer submultiple of the IF frequency of an IF receiver of said system, and a radio-frequency single side band modulator having one input coupled to said radio frequency source, a second input coupled to said spacing frequency oscillator for providing an upper side band output and a lower side band output, one of said outputs being being combined with said radio frequency input thereto, and one of said side band outputs being coupled as an input to said pulsed modulator for comprising a multiple frequency generating loop.

There is also provided receiving means having a first and second polarization-sensitive channel responsive to a respective first and second mutually orthogonally polarized component of received echoes of said transmission, the polarization of one of said polarized components corresponding to the transmitted polarization, each said channel including a receiver mixer having an input responsive to said received echoes (for providing intermediate frequency receiver signals) and tuned intermediate frequency signal translating means having a bandpass substantially equal to the reciprocal of said transmitted pulsewidth and further having a center frequency equal to an integer multiple of said modulating frequency. There is further provided first and second automatic gain control means, each responsively coupled to an output of a mutually exclusive one of said polarization-sensitive channels and having a gain control input commonly coupled to an output of that one of said automatic gain control means coupled to that channel sensitive to said transmitted polarization, and third gain control means responsive to the output of that automatic gain control means which is coupled to said receiver channel sensitive to said transmitted polarization.

Accordingly, it is a general object of the subject invention to provide an improved mapping radar for distinguishing cultered discrete targets from amid a clutter background.

Another object of the invention is to provide a suppressed clutter background in the vicinity of a discrete target display.

A further object is to provide a ground map background for a discrete target display for terminal guidance purposes and the like.

These and other objects of the invention will become apparent from the following description, taken together with the accompanying drawings in which:

BRIEF DESCRIPTION OF THE DRAWINGS

In the figures, like reference characters refer to like parts.

DESCRIPTION OF THE PREFERRED EMBODIMENTS

Figure 1:
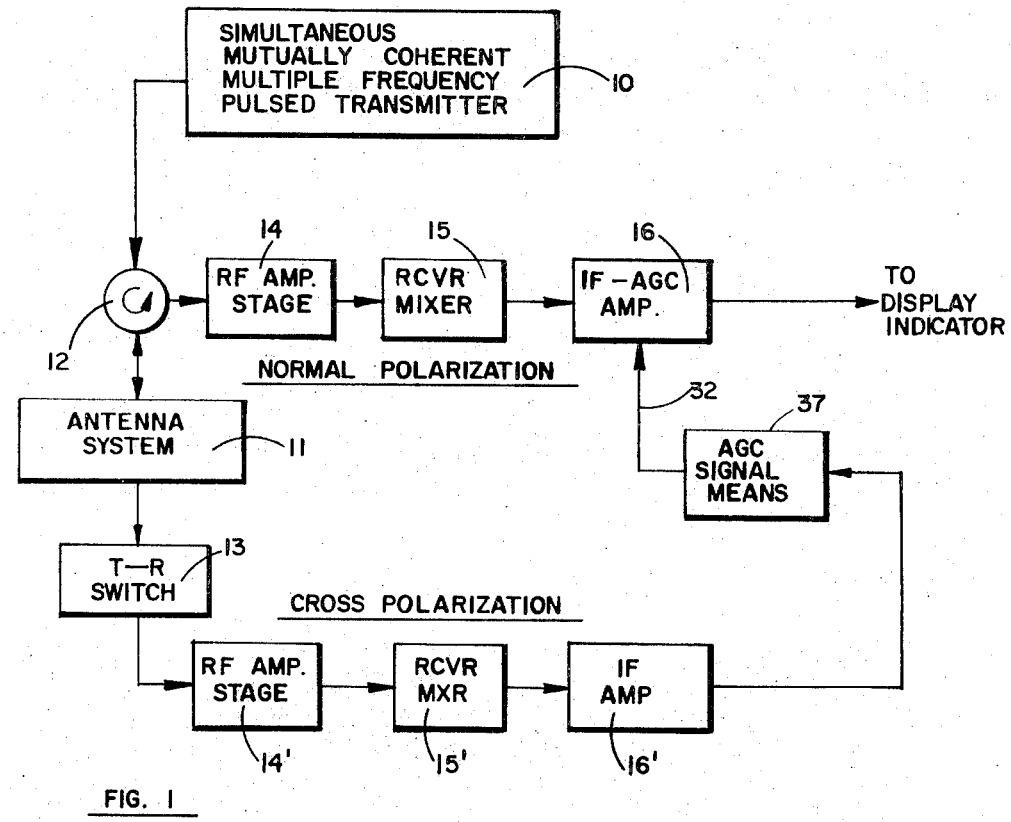
FIG. 1 is a block diagram of a system embodying the concept of the invention.

Referring now to FIG. 1, there is illustrated a block diagram of a system embodying the concept of the invention. There is provided a pulsed energy system for single-plane polarized simultaneous transmission of a plurality of carrier frequencies and including receiving means having two plane-polarization sensitive channels responsive to respective mutually orthogonal polarized components of received echoes of the transmission, the polarization plane of one of said components corresponding to the transmitted polarization. There is provided transmitting means 10 coupled to a polarized antenna system 11 by a circulator 12 for simultaneous transmission of a plurality of mutually coherent carrier frequencies having a common single plane of polarization (referred to hereinater as normal polarization).

Figure 2:
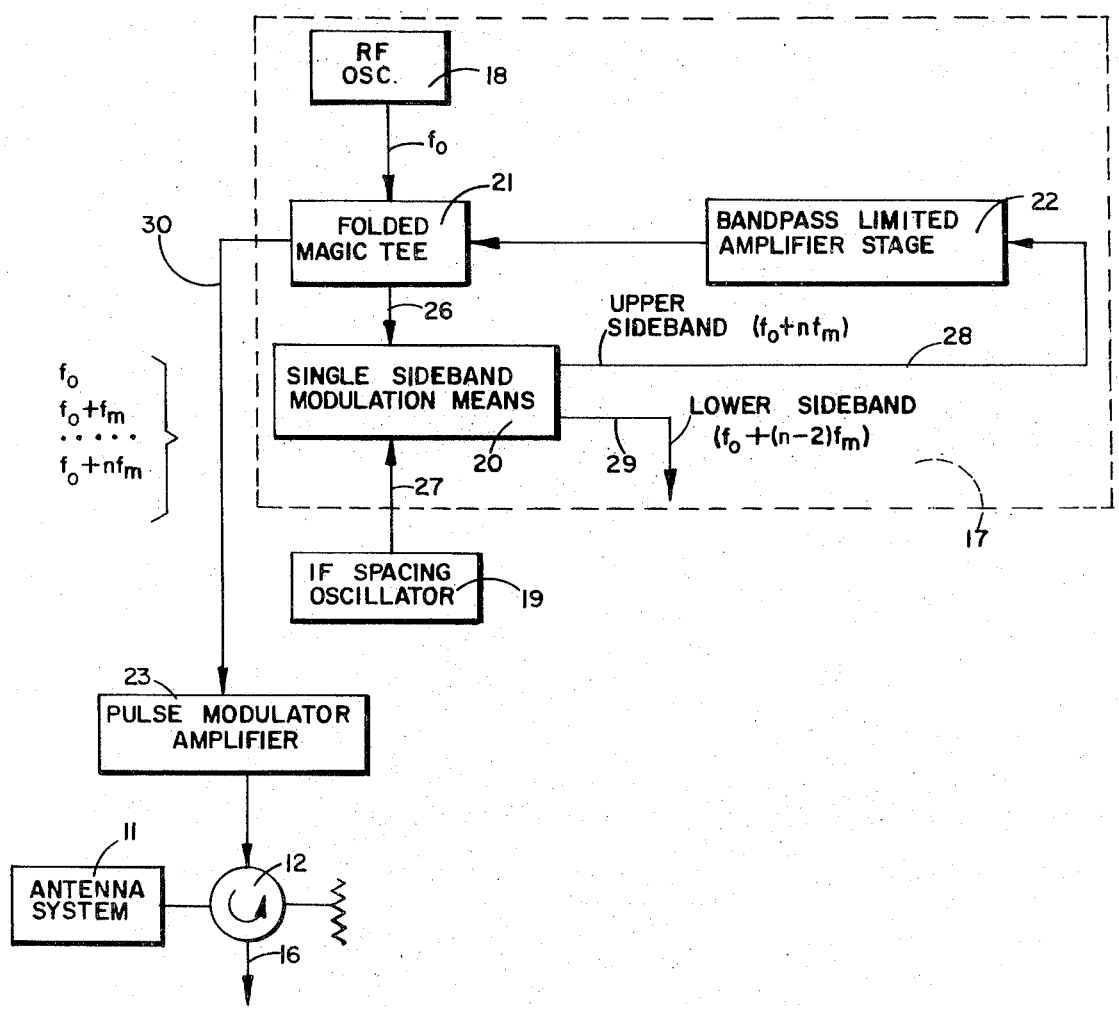
FIG. 2 is a block diagram illustrating in further detail the arrangement of the transmitter of FIG. 1; and and FIG. 3 is a block diagram of an alternate arrangement of a portion of the receiver of FIG. 1 and illustrating another aspect of the invention.

The construction and arrangement of transmitting means 10 is shown more particularly in FIG. 2 as closed loop radio-frequency single side-band modulation means 17 comprising a radio frequency source 18, a spacing frequency oscillator 19, a radio frequency single side band modulator 20 having one input 26 thereof coupled (by a folded magic tee 21) to an output of radio frequency source 18, a second input 27 being coupled to an output of spacing frequency oscillator 19 for providing an upper sideband output 28 and a lower sideband output 29. Output 28 is coupled (by a bandpass limited stage 22) to an input of tee 21 as to be combined with the input from source 18. A second output 30 of tee 21 couples upper sideband output 28 to a pulse modulator-amplifier stage 23. The pulsed output of modulator 23 is a concomitant plurality of mutually coherent frequencies uniformly spaced apart in frequency by the frequency of oscillator 19, which corresponds to an integer submultiple of the IF frequency of an IF receiver (described more fully hereinafter). A further description of the arrangement and operation of the transmitter of FIGS. 1 and 2 is included in copending U.S. application Ser. No. 476,630 filed Aug. 2, 1965, by C. R. Barrett for a Multiple Frequency Radar System Having Improved Response to Small Targets, and owned by North American Rockwell Corporation, assignee of the subject invention.

Referring again to FIG. 1, there is provided receiving means having a first and second polarization channel coupled to a respective output of antenna system 11, as to be responsive to a respective first (normal) and second mutually orthogonal polarized component of received echoes of the pulsed transmission, the polarization of the first polarized component corresponding to the transmitted or normal polarization and the polarization of the second component referred to as cross polarization.

The construction and arrangement of dual polarization antenna system 11 is known in the art, as is indicated in FIG. 1 of U.S. Pat. No. 3,403,394 issued to C. L. Roualt for Diversity Radar System.

Each channel of the receiving means of FIG. 1 of the subject invention includes a radio frequency amplifier stage 14 coupled to a respective one of the normal polarization and cross polarization receiving outputs of antenna 11 by suitable T-R means 12 and 13 (for insuring receiver isolation from transmitter 10). Each receiver channel further includes a non-linear receiver-mixer 15 having an input responsively coupled to an output of the radio frequency amplifier stage 14 associated with such channel for providing intermediate frequency receiver signals indicative of the beat frequency differences between the concomitant plurality of carrier frequencies of the received echoes, which beat frequency response is selectively amplified by tuned intermediate frequency signal translating means 16 having a bandpass substantially equal to the reciprocal of the transmitted pulsewidth and further having a center frequency equal to an integer multiple of the frequency of oscillator 19. A further description of the arrangement and cooperation of elements 15 and 16 is included in the above-mentioned copending U.S. patent application Ser. No. 476,630 filed Aug. 2, 1965.

In the arrangement of FIG. 1, the IF amplifier 16 of the normal polarization responsive receiver channel further comprises or includes an automatic gain control function, a gain control input 32 thereof being responsively coupled to the IF output of the cross polarization responsive receiver channel by AGC signalling means 37. Such received signal processing means, responsive to both channels of the receiving means, cooperates to distinguish discrete targets from clutter while allowing a suppressed clutter display for ground map orientation of such targets.

In normal operation of the arrangement of FIG. 1, received echoes of linear polarized transmission will exhibit only a small degree of cross-polarization for a discrete target, while received echoes from random clutter will exhibit a large degree of cross polarization. Thus, in a target-free clutter-filled range bin of a range trace signal return, only about half of the clutter return at such range bin occurs in the output of the normal polarization receiver channel, and the remainder occurs in the output of the cross polarization channel. Such large cross-polarization receiver signal results in controlling the gain of IF-AGC amplifier 16 (in the normal polarization receiver channel) so as to further suppress the normal polarization clutter return signal in such range bin. In a range bin containing a discrete target, the resulting low level output of the cross-polarization channel within such range bin increases the gain of the normal polarization channel IF-AGC amplifier 16, as to enhance the target signal occurring in such range bin. Where both a discrete target and a random clutter background commonly occur in a given range bin, the ratio of the cross polarization component of the combined target and the clutter received signal to the normal polarization component, while greater than that for a discrete target alone, will be less than that for a target-free random clutter background alone. Therefore, the attenuation of the combined target and clutter normal polarization component does not obscure the presence of a discrete target in such range bin.

Figure 3:
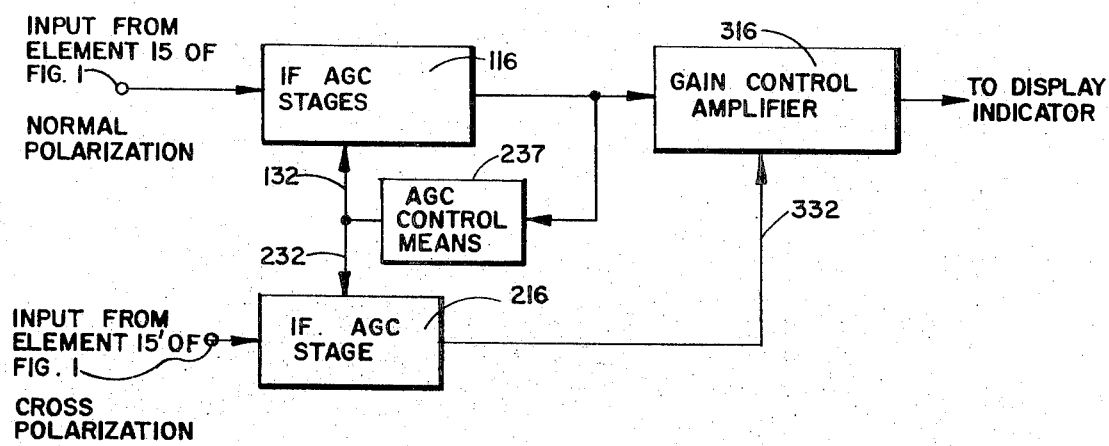

The effects of variations in received signal strength due to radar range and other factors may be reduced by signal normalization, as shown in FIG. 3. In such alternate arrangement of the signal processing means of FIG. 1, there is provided first and second intermediate frequency automatic gain-control means 116 and 216, each responsively coupled to an output of a receiver-mixer of a mutually exclusive one of the two polarization sensitive receiver channels and having a gain control input 132 and 232 commonly coupled to an output of IF-AGC stage 116 through AGC control means 237. A third gain control stage 316 is input coupled to the output of AGC stage 116 and has a gain control input 332 coupled to an output of the receiver-mixer of the cross-polarization sensitive receiver channel. The construction and arrangement of suitably fast AGC stages for such normalization and gain control purposes is known in the art, as indicated for example in U.S. Pat. No. 3,251,060 issued to W. L. Mitchell for Profiloscope.

In normal operation of the arrangement represented by FIG. 3, the gain of amplifier 116 tends to vary inversely with the signal level input thereto, whereby the output thereof tends to remain constant, while the outpu of level of amplifier 216 tends to vary directly with the applied input thereto and inversely with the applied input to amplifier 116, as to be indicative of the ratio of the cross polarization content of the received signal to the normal polarization content thereof. Thus, the substantially constant signal input applied to amplifier 316 (by amplifier 116) is inversely gain modulated by the gain-control input to amplifier 316 (from amplifier 216), resulting in a display signal output signal output which varies as a function of the ratio of the normal polarization content to the cross polarization content of the received signals. In this way, the display of a discrete target signal (having little cross-polarization content) is enhanced and the display of clutter (having a substantial cross polarization content) is suppressed.

Accordingly, there has been disclosed a pulsed energy system employing transmission of a simultaneous plurality of mutually coherent carrier frequencies for enhanced detection of discrete targets amid a clutter background and employing polarization diversity processing of received signals for further enhancing the detection of said discrete targets while providing a suppressed clutter backgrround for ground map orientation of such targets.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In a pulsed energy ranging system, means for enhancing the detection of discrete targets against an associated clutter background, comprising transmitting means for simultaneous transmission of a plurality of carrier frequencies having a common single plane of polarization;

receiving means having a first and second polarization-sensitive channel responsive to a respective first and second mutually orthogonally polarized component of received echoes of said transmission, the polarization of one of which polarized components corresponding to the transmitted polarization; and received signal processing means responsive to both said channels of said receiving means for distinguishing discrete targets from clutter while allowing a suppressed clutter display for ground map orientation of such targets, said received signal processing means comprising automatic gain control means having a first input responsively coupled to an output of that polarization-sensitive channel sensitive to said transmitted polarization and further having a gain control input responsively coupled to an output of the other of said polarization sensitive channels for varying the gain of said gain control means substantially inversely with variations in the output of said other polarization-sensitive channel.

2. The device of claim 1 in which there is further provided signal normalization means for normalizing the response of said channels of said receiving means as a function of said polarized components of said received echoes having a polarization corresponding to said transmitted polarization.

3. The device of claim 1 in which there is further provided second and third automatic gain control means, each responsively coupled to an output of a mutually exclusive one of said polarization channels and having a gain control input commonly coupled to an output of that one of said second and third gain control means coupled to that channel sensitive to said transmitted polarization, said first input of said first mentioned gain control means being coupled to said output of that one of said second and third gain control means coupled to that channel sensitive to said transmitted polarization.

4. In a pulsed energy ranging system, means for enhancing the detection of discrete targets against an associated clutter background, comprising transmitting means for simultaneous transmission of a plurality of carrier frequencies having a common single plane of polarization;

receiving means having a first and second polarization-sensitive channel responsive to a respective first and second mutually orthogonally polarized component of received echoes of said transmission, the polarization of one of which polarized components corresponding to the transmitted polarization; and received signal processing means responsive to both said channels of said receiving means for distinguishing discrete targets from clutter while allowing a suppressed clutter display for ground map orientation of such targets, said received signal processing means comprising first and second automatic gain control means, each responsively coupled to an output of a mutually exclusive one of said polarization-sensitive channels and having a gain control input commonly coupled to an output of that one of said automatic gain control means coupled to that channel sensitive to said transmitted polarization; and third gain control means responsive to the output of said automatic gain control means coupled to said channel sensitive to a polarization orthogonal to said transmitted polarization.

5. In a single-plane polarized pulsed energy system for simultaneous transmission of a plurality of carrier frequencies and subsequent reception of similarly single-plane polarized echoes of such single-plane polarized simultaneous transmission, the improvement comprising a receiver channel responsive to received echoes of said single plane polarized transmission and having a polarization plane orthogonal to said transmission polarization; and gain control means responsive to said received similarly single plane polarized echoes and having a gain control input responsively coupled to an output of said receiver channel.

6. The device of claim 5 in which there is further provided means for normalizing said received echoes having a polarization plane orthogonal to said transmission polarization as a function of said similarly single plane polarized received echoes.

7. The device of claim 5 in which there is further provided second gain control means interposed at an input of said first mentioned gain control means and having a gain control input;

third gain control means interposed at said gain control input of said first mentioned gain control means and having a gain control input;

said gain control inputs of said second and third gain control means being responsively coupled to the output of said second gain control means.

8. In a pulsed energy ranging system, means for enhancing the detection of discrete targets against an associated clutter background, comprising transmitting means including radio frequency source for simultaneous transmission of a plurality of mutually coherent carrier frequencies having a common single plan of polarization and further including a spacing frequency oscillator for providing a modulating frequency equal to an integer submultiple of the IF frequency of an IF receiver of said system, and a radio-frequency single side band modulator having one input coupled to said radio frequency source, a second input coupled to said spacing frequency oscillator for providing an upper side band output and a lower side band output, one of said outputs being combined with said radio frequency input thereto, and one of said side band outputs being coupled as an input to a pulsed modulator for comprising a multiple frequency generating loop;

receiving means having a first and second polarization-sensitive channel responsive to a respective first and second mutually orthogonally polarized components of received echoes of said transmission, the polarization of one of which polarized components corresponding to the transmitted polarization; and received signal processing means responsive to both said channels of said receiving means for distinguishing discrete targets from clutter while allowing a suppressed clutter display for ground map orientation of such targets, each said channel of said receiving means comprising non-coherent receiving means including a receiver mixer having an input responsive to said received echoes for providing intermediate frequency receiver signals; and tuned intermediate frequency signal translating means having a bandpass substantially equal to the reciprocal of said transmitted pulsewidth and further having a center frequency equal to an integer multiple of said modulating frequency; and said received signal processing means comprising automatic gain control means having a first input responsively coupled to an output of that polarization-sensitive channel sensitive to said transmitted polarization and further having a gain control input responsively coupled to an output of the other of said polarization sensitive channels, for varying the gain of said gain control means substantially inversely with variations in the output of said other polarization-sensitive channel.

9. The device of claim 8 in which there is further provided signal normalization means for normalizing the response of said channels of said receiving means as a function of said polarized components of said received echoes having a polarization corresponding to said transmitted polarization.

10. In a pulsed energy ranging system, means for enhancing the detection of discrete targets against an associated clutter background, comprising transmitting means including a radio frequency source for simultaneous transmission of a plurality of mutually coherent carrier frequencies having a common single plane of polarization and further including
 a spacing frequency oscillator for providing a modulating frequency equal to an integer submultiple of the IF frequency of an IF receiver of said system, and
 a radio-frequency single side band modulator having one input coupled to said radio frequency source, a second input coupled to said spacing frequency oscillator for providing an upper side band output and a lower side band output, one of said outputs being combined with said radio frequency input thereto, and one of said side band outputs being coupled as an input to a pulsed modulator for comprising a multiple frequency generating loop;

receiving means having a first and second polarization-sensitive channel responsive to a respective first and second mutually orthogonally polarized component of received echoes of said transmission, the polarization of one of said polarized components corresponding to the transmitted polarization, each said channel including
 a receiver mixer having an input responsive to said received echoes for providing intermediate frequency receiver signals, and
 tuned intermediate frequency signalling means coupled to said mixer and having a bandpass substantially equal to the reciprocal of said transmitted pulsewidth and further having a center frequency equal to an integer multiple of said modulating frequency;

first and second automatic gain control means, each responsively coupled to an output of a mutually exclusive one of said polarization-sensitive channels and having a gain control input commonly coupled to an output of that one of said automatic gain control means coupled to that channel sensitive to said transmitted polarization; and third gain control means responsive to the output of said automatic gain control means coupled to said channel sensitive to a polarization orthogonal to said transmitted polarization.

* * * * *